United States Patent
Dodge et al.

[11] Patent Number: 6,023,996
[45] Date of Patent: Feb. 15, 2000

[54] OPTICAL FIBER PREPARATION UNIT

[75] Inventors: Shawn W. Dodge, Brandenton; Scot K. Ware, Nokomis, both of Fla.

[73] Assignee: Amherst International, Inc., Sarasota, Fla.

[21] Appl. No.: 08/956,282

[22] Filed: Oct. 23, 1997

[51] Int. Cl.[7] ..................................................... H02G 1/12
[52] U.S. Cl. ............................................. 81/9.51; 81/9.41
[58] Field of Search ................................ 81/9.51, 9.41, 81/9.44; 29/564.4

[56] References Cited

U.S. PATENT DOCUMENTS

| | | |
|---|---|---|
| 2,978,565 | 4/1961 | Sullivan et al. . |
| 3,765,276 | 10/1973 | Pollitt . |
| 3,832,767 | 9/1974 | Petree ..................................... 81/9.51 X |
| 3,864,829 | 2/1975 | Williams . |
| 3,980,861 | 9/1976 | Fukunaga . |
| 4,059,892 | 11/1977 | Siden . |
| 4,261,231 | 4/1981 | Bleakley . |
| 4,271,729 | 6/1981 | Perrino et al. . |
| 4,386,541 | 6/1983 | Robertson et al. . |
| 4,434,554 | 3/1984 | Korbelak . |
| 4,479,407 | 10/1984 | Mikami et al. ........................... 81/9.51 |
| 4,641,428 | 2/1987 | Anderson .............................. 81/9.51 X |
| 4,643,520 | 2/1987 | Margolin . |
| 4,748,871 | 6/1988 | Zdzislaw . |
| 4,790,465 | 12/1988 | Fellows et al. . |
| 4,805,301 | 2/1989 | Chapin et al. . |
| 4,932,292 | 6/1990 | Merrick . |
| 4,954,152 | 9/1990 | Hsu et al. . |
| 4,958,905 | 9/1990 | Tynes et al. . |
| 4,969,703 | 11/1990 | Fyfe et al. . |
| 4,971,418 | 11/1990 | Dorsey et al. . |
| 5,033,335 | 7/1991 | Yatsu et al. . |
| 5,138,910 | 8/1992 | Ishikawa et al. ........................ 81/9.51 |
| 5,298,105 | 3/1994 | Dorsey . |

*Primary Examiner*—D. S. Meislin
*Attorney, Agent, or Firm*—Banner & Witcoff, Ltd.

[57] ABSTRACT

A device and process for stripping the coating from a coated fiber. The device comprises a base and a coated fiber retaining member coupled to the base. The coated fiber retaining member includes a fiber holding portion for retaining a portion of the coated fiber along a longitudinal axis so that the fiber does not bend or kink. The device also comprises a stripping tool mounted to the base which can be operated with a single hand. The stripping tool includes a plurality of stripping blades which are each coupled to a respective gripping handle and moveable toward and away from the coated fiber retaining member. The stripping blades include a notch therein with a beveled side facing the coated fiber retaining member. Also, the stripping blades extend entirely around the coated fiber when the handles are placed in a stripping position. A heating element is disposed on the side of the stripping blades opposite from the coated fiber retaining member. The heating element is sized so as to remain spaced from a coated fiber inserted into the stripping tool to be stripped of its coating. The process comprises the steps of inserting a free end of a coated fiber into a stripping tool and heating the free end without contacting the free end. The process also comprises cutting into the coating of the coated fiber with a stripping member and translating the coated fiber relative to the stripping member to remove the coating between the stripping member and the free end of the fiber in a single piece.

13 Claims, 8 Drawing Sheets

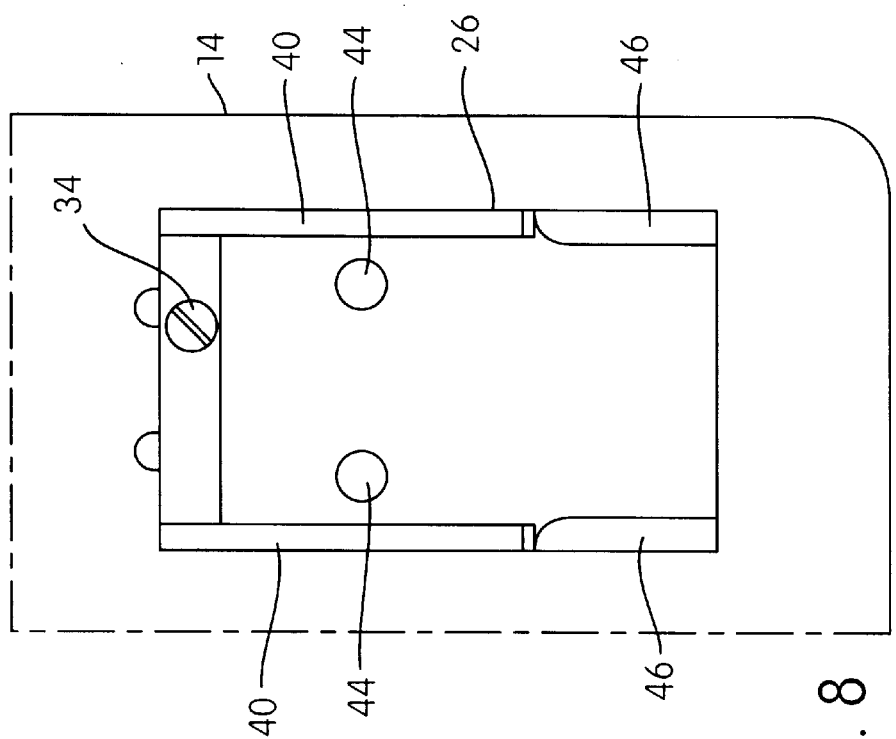
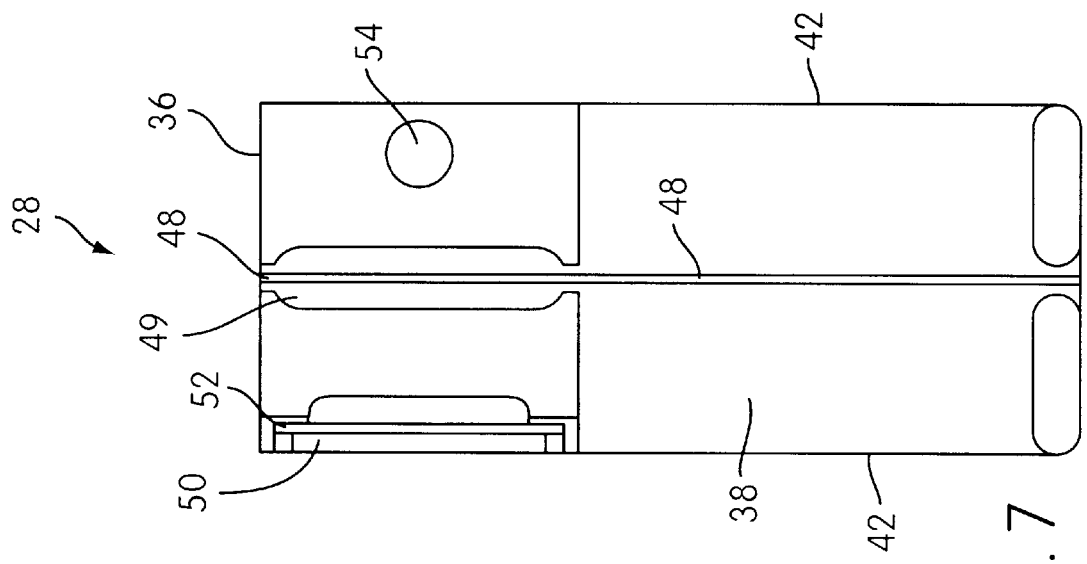
FIG. 8
FIG. 7

OPTICAL FIBER PREPARATION UNIT

CROSS REFERENCE TO RELATED APPLICATIONS

This application is related to U.S. patent application Ser. No. 08/956,283 of Shawn W. Dodge and Scot K. Ware entitled "Optical Fiber Preparation Unit" filed Oct. 23, 1997 which is herein incorporated by reference.

FIELD OF INVENTION

The present invention relates to optical fibers splicing, and particularly to an optical fiber preparation unit having a fiber stripper that is used to strip a coating from an optical fiber, a cleaver, and a base to which the cleaver and stripper are mounted.

BACKGROUND OF THE INVENTION

Optical fibers are normally constructed with a protective outer coating, which is frequently acrylate or another plastic material. The coating material is typically applied to the fiber during manufacture while the coating is still tacky. The coating may be subsequently cured by ultraviolet light to form the coated fiber. A jacket may be provided around one or more coated fibers for protection. Prior to splicing the optical fibers, the ends of two optical fibers to be spliced together needs to be stripped of their protective coating and cleaved to provide an accurately sheared end surface for mating.

Existing stripping devices include a tool as shown in U.S. Pat. No. 4,271,729 to Perrino et al. Such a tool and similar tools are sold by Klein Tools of Chicago, Ill. and Micro Electronics, Inc. of Newport, R.I. Tools of this type may include two elongated blade members 1, with each blade member 1 holding an elongated metal strip 2, details of which can be seen in FIGS. 1 and 2. Each metal strip 2 typically includes a semi-circular notch 3 with a beveled surface 4. The blade members 1 are moved together and apart in a direction perpendicular to the longitudinal axis of the coated fiber 5 by a pair of handles, not shown in FIGS. 1 and 2. When the handles are pivoted toward each other against a biasing force, the leading edge 6 of the beveled notches 3 forms a circle having a diameter the same as, or just slightly larger than, the diameter of the fiber 7. In operation, a coated fiber 5 is inserted into the tool and the handles are squeezed. This causes the leading edge 6 of the notches 3 to cut into the coated fiber 5 around the entire circumference. The coated fiber 5 is then pulled along the axis of the fiber, i.e., in the direction of arrow 8, into the beveled surface 4 of the notches 3 so that the beveled surface scrapes the coating 9 off of the fiber 7 in a fragmented manner as the fiber is being pulled against the beveled edge. U.S. Pat. No. 4,969,703 to Fyfe et al. shows a device similar to the tools disclosed in U.S. Pat. No. 4,271,729 mounted to a base with a movable fiber holding clamp.

However, these stripping tools and others that strip fibers using similar scraping methods have significant drawbacks. As the fiber is pulled through the beveled notched portions of the blades, their constant scraping of the coating tends to make the blade holders oscillate slightly. This can lead to the fiber becoming scratched. Other strippers operate on the theory of scraping and are also highly susceptible to scratching the fiber. Moreover, microscopic alignment and tolerancing errors can also cause the fiber to be scratched. This can be significant as one small scratch in the fiber can reduce its strength by up to 90%. Additionally, the hand-held stripping units as well as the stripper unit shown in U.S. Pat. No. 4,969,703 lack exceptional stability which could create misalignment between the fiber and the stripping blade and also cause scratching.

Attempts to solve these drawbacks have not been entirely successful. U.S. Pat. No. 5,033,335 to Yatsu et al. discloses the use of a heating element which applies direct heat to a clamped free end of the coated fiber. The heating element is intended to soften the coating. However, merely softening the coating does not solve the problem of scratching. Moreover, the combination of clamping the free end of the fiber and applying direct heat can damage the fiber. Additionally, the fact that the stripping blade surface does not extend entirely around the circumference of the coated fiber makes the stripping process less than optimal.

U.S. Pat. No. 4,971,418 to Dorsey et al. attempts to overcome these problems by stripping the coating off of the fibers by using a combination of an acid and a laser to melt away the coating. However, this process includes other drawbacks, including the generation of toxic waste, the exposure of potentially hazardous material to the operator, and it is a costly process. Accordingly, a solution that overcomes the drawbacks of the prior art was thus necessary.

SUMMARY OF THE INVENTION

It is an object of the present invention to provide an improved optical fiber preparation unit to strip and shear coated fibers prior to splicing.

It is an object of the present invention to overcome the drawbacks of the prior art and provide an improved optical fiber preparation unit for stripping fiber without bending, kinking or scratching the fiber.

It is also an object of the present invention to provide a stripping tool which can be operated by a single hand. It is further an object to provide such a stripper which can also be adjusted to strip different coating lengths for different splicing machines.

The present invention relates to a device for stripping the coating from a coated fiber, the device comprises a base and a coated fiber retaining member coupled to the base. The coated fiber retaining member includes a fiber holding portion for retaining a portion of the coated fiber along a longitudinal axis so that the fiber does not bend or kink. The device also comprises a stripping tool mounted to the base. The stripping tool includes a plurality of stripping blades which are each coupled to a respective gripping handle and moveable toward and away from the coated fiber retaining member. The stripping blades include a notch therein with a beveled side facing the coated fiber retaining member. Also, the stripping blades extend entirely around the coated fiber when the handles are placed in a stripping position. A heating element is disposed on the side of the stripping blades opposite from the coated fiber retaining member. The heating element is sized so as to remain spaced from a coated fiber inserted into the stripping tool to be stripped of its coating. The stripping device of the present invention can be operated by a single hand, thereby leaving a second hand free to perform separate or related operations. The present invention also includes a cleaver coupled to the base for cutting the fiber after a portion of its coating has been stripped by the stripping tool. Unlike the prior art, the cleaver and stripping unit are attached to the base and cooperate with each other to balance the base.

The present invention also relates to a process for stripping an optical cable having a fiber and a coating. The process comprises the steps of inserting a free end of a coated fiber into a stripping tool and heating the free end without contacting the free end. The process also comprises cutting into the coating of the coated fiber with a stripping member and translating the coated fiber relative to the stripping member to remove the coating between the stripping member and the free end of the fiber in a single piece.

Unlike contemporary strippers, the present invention does not fragment the coating as it cuts. Instead, it uses heat to soften the coating and then nicks it with the blade so that the coating is pulled off in one piece. The blades of the present invention are used to nick and hold the coating, they are not used to fragment it. The use of the blades as holders helps to keep the blades from scratching or kinking the fiber.

BRIEF DESCRIPTION OF THE DRAWINGS

FIG. 7 is a top plan view of the fiber holding member shown with its pivotal clamping element in an open position;

FIG. 8 is a top plan view of the support block;

DETAILED DESCRIPTION OF THE INVENTION

Figure 1:
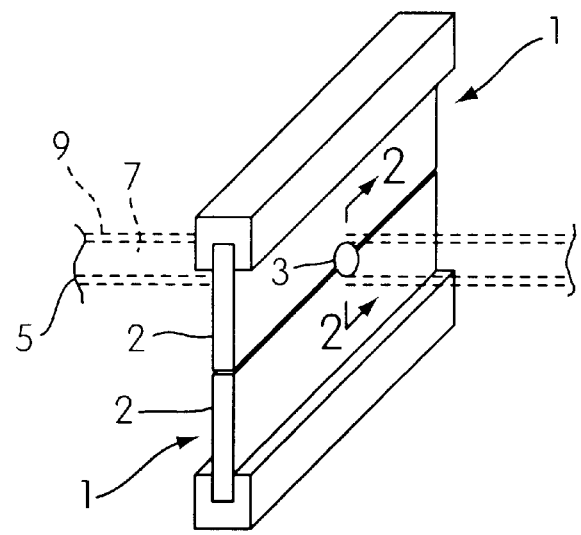
FIG. 1 is a detailed perspective view of the scraping blades of a prior art stripping device.

A splicing preparation unit is shown in drawing FIGS. 3–9 and is generally designated by reference numeral 12. As can been seen from FIG. 3, splicing preparation unit 12 includes a single generally horizontal base 14, a stripper unit 18 mounted on the base 14, and a cleaver unit 16, schematically shown in FIG. 3, mounted to the base 14.

The base 14 is preferably made from DELRIN or any suitable plastic or metal material. Base 14 preferably includes a series of holes or cutouts 20 therein. The cutouts 20 are for mounting the cleaver unit 16 and/or permitting access to portions of the cleaver unit 16 for adjustment of cleaver features or replacement of parts, e.g., batteries. The cleaver unit 16 is known in the art and is commercially available. Preferred cleavers are made by York Technology, Ltd of England and Photon Kinetics Inc of California. However, other cleavers may be used. Depending upon the cleaver unit 16 used, it is preferably modified to include a holder 17 to accommodate the movable fiber holding member as shown in FIG. 7 and described below. Similarly, the location and size of cutouts 20 would also be modified to accommodate the desired cleaver unit 16.

The base 14 stabilizes the cleaver unit 16 and the components of the stripper unit 18 by balancing the weight of each on the base 14 to achieve increased stability over existing units. This stability enhances the performance of both units, especially the stripper unit 14 as it is important to make sure that the fiber is not scratched which could occur as a result of the instability of the unit. The base 14 also spaces the units 16 and 18 apart by a distance between 2–6 inches, preferably approximately 3 inches. This spacing enhances the efficiency by the user in terms of conservation of motion and ergonomics.

Figure 3:
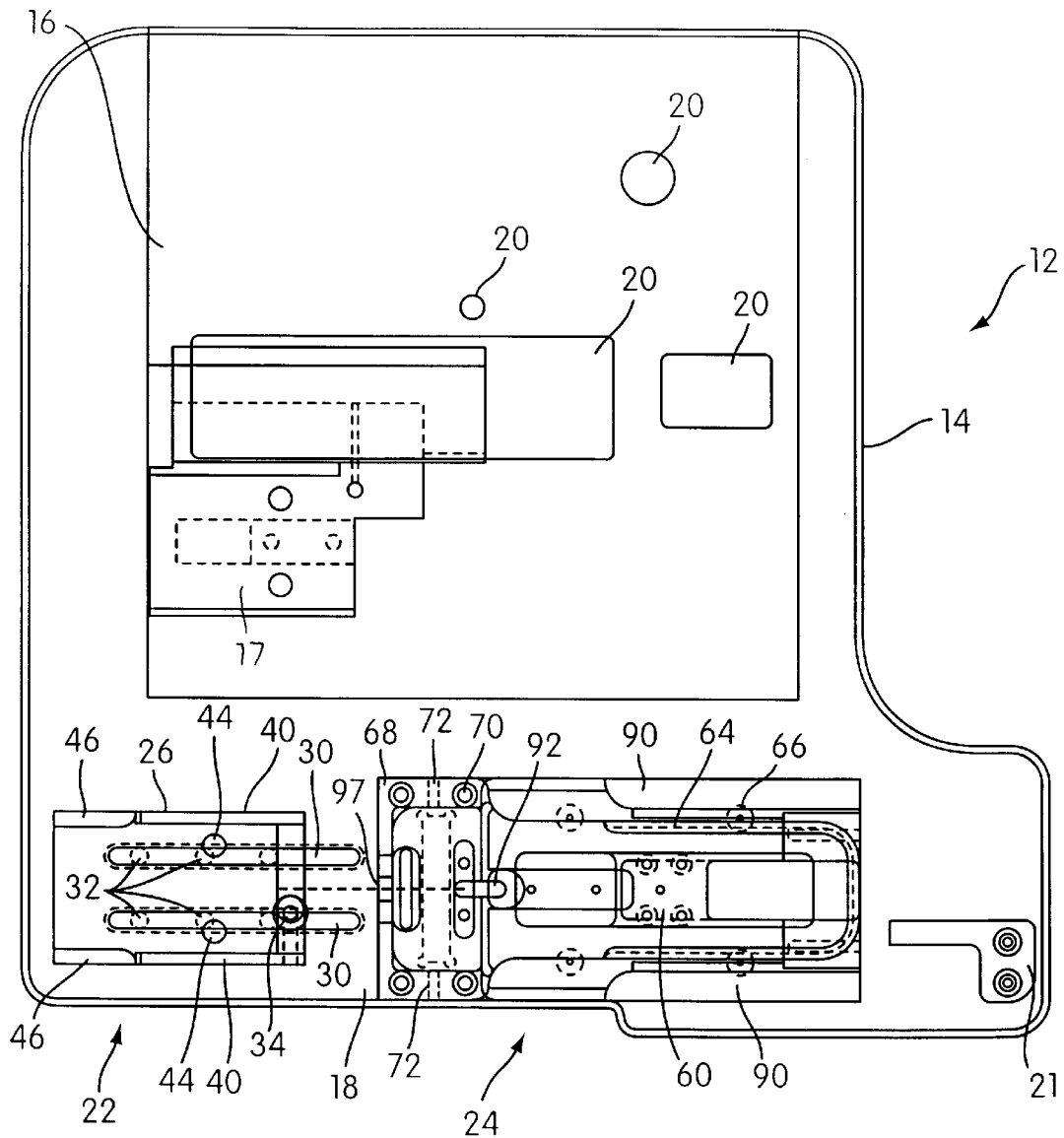
FIG. 3 is a top plan view of the optical fiber preparation unit of the present invention.
Figure 4:
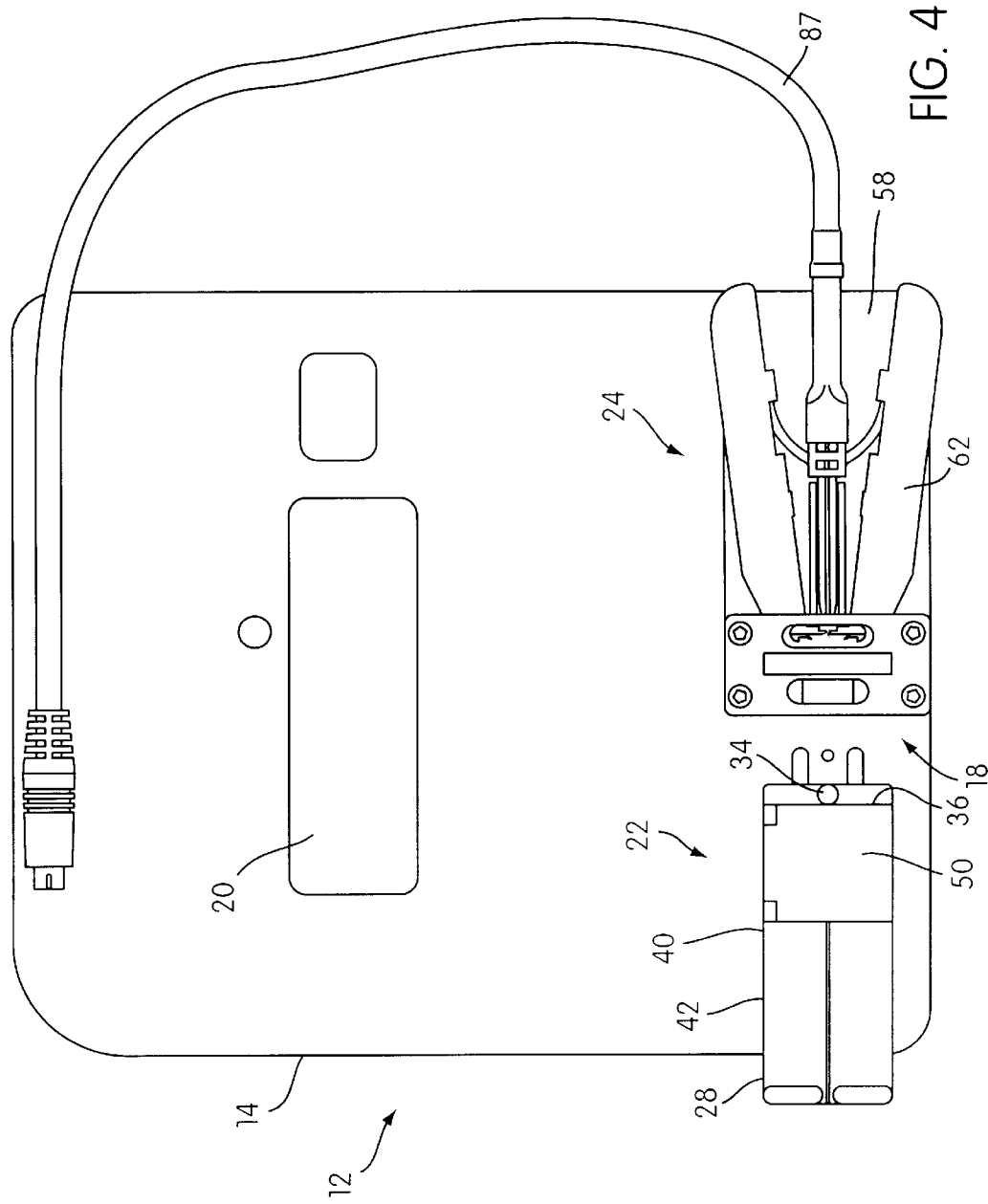
FIG. 4 is a top plan view of the optical fiber preparation unit of the present invention shown with the cleaver removed.

FIG. 3 also depicts a positioning block 21 mounted to the base 14. The positioning block 21 is an optional feature which could be used to effect "window" stripping, i.e., where a portion of the coating is removed between coated portions. Preferably, a positioning block 21 is adjustably mounted to base 14 to permit adjustment of the characteristics of the stripped window portion. Positioning block 21 would not be used if it was desired to strip the coating off of the end portion of a coated fiber. A base 14 not utilizing this feature is shown in FIGS. 4–6 and 9.

The stripping unit 18 includes two portions: a fiber holding portion 22 and a fiber stripping portion 24. The fiber holding portion 22 holds a coated fiber while the fiber stripping portion 24 engages the coated fiber at a determined location and removes the coating on the fiber between that point and the free end of the fiber. The stripping unit 18 can be adjusted to strip longitudinal lengths of between 2 and 25 mm in order to accommodate different splicing machines which require different stripped lengths of fiber. The fiber holding portion 22 includes a support block 26 and a removable fiber holder 28 removably coupled to support block 26. Support block 26 accurately positions the fiber holder 28, and therefore the coated fiber therein, with respect to base 14 and fiber stripping portion 24. To accurately position fiber holder 28 with respect to support block 26 and support block 26 with respect to base 14, coarse and fine positioning systems are provided. The support block 26 and fiber holder 28 maintain the fiber in a straight line along the axis of the base so that microbending or kinking does not occur in the fiber.

The coarse positioning system also serves to attach the support block 26 to the base 14. In a preferred embodiment, this system includes spaced parallel slots 30 located in the base 14, spaced threaded holes, not shown, in the bottom of the support block 26, and mounting screws 32 (shown in phantom lines) which extend through the slots 30 and into the holes in the bottom of support block 26. The support block 26 can be accurately positioned as desired with respect to base 14 and stripping portion 24 and the screws 32 can be tightened to attach the support block 26 to the base 14. On the underside of base 14, the slots 30 preferably include a recessed portion to permit the adjustment and attachment features as described without protruding below the bottom surface of the base 14. Any other suitable adjustment system may be used.

The fine adjustment system adjusts the longitudinal position of the removable fiber holder 28 with respect to the support block 26. This system includes a positioning screw 34 threadably inserted into a hole adjacent the front of support block 26. The screw 34 includes a head portion with an offset outer surface such that the distance between the outer surface of the head of screw 34 and the location of the hole varies depending upon the angular rotation of the screw 34. This provides a stop for the leading edge 36 of the base section 38 of removable fiber holder 28 and acts as an eccentric camming surface. Accordingly, the removable fiber holder 28 and the position of the fiber can be adjusted by rotating screw 34. Support block 26 includes upwardly projecting guide walls 40 that guide the lateral position of removable fiber holder 28 by guiding the side edges 42 of the fiber holder 28.

Removable fiber holder 28 is positioned and coupled to support block 26 by a magnetic coupling system including a pair of magnets 44 positioned on the upper surface of support block 26 and a pair of magnets, not shown, positioned on the lower side of removable fiber holder 28. The poles of the magnets are oriented such that the magnets 44 on support block 26 attract the magnets on the underside of removable fiber holder 28. However, the relative positioning of the magnets and the stopping effect of the positioning screw 34 prevent the magnets on the fiber holder 28 from becoming coincident with the magnets 44. Accordingly, when the removable fiber holder 28 is placed on the support block 26, the magnets create an attraction force that holds the fiber holder 28 to the support block 26 vertically and pushes the leading edge 36 of the fiber holder 28 into positioning screw 34. The support block 26 further includes longitudinal grooves 46 in its side walls 40 to aid in the removal of the fiber holder 28 from the support block 26 after the end of the fiber has been stripped. A similar magnetic coupling system is preferably provided on holder 17 of the cleaver unit 16 so that after the fiber has been stripped, the fiber holder 28 can be lifted off of support block 26 and placed on holder 17.

The fiber holder 28 is shown in further detail in FIG. 7. Base section 38 further includes a longitudinal V-shaped groove 48 extending along its entire length for securely holding a coated fiber therein. The forward portion of the base section 38 includes a recess 49 on opposing sides of groove 48. A cover 50 is pivotally attached to base section 38 by a hinge and includes a downwardly depending block 52. A magnet 54 is mounted in the surface of the base section 38 disposed on the side of the groove 48 opposite the hinge attachment between the cover 50 and the base section 38. To couple a coated fiber to the fiber holder 28, the cover 50 is opened and the coated fiber is inserted into the groove 48 with a predetermined fiber length extending in front of the leading edge 36 of the base section 38. The fiber may be measured by any suitable tool or device. The cover 50 is then closed and downwardly depending block 52 fills the recess 49 and clamps the coated fiber into the groove 48. The magnet 54 provides an attraction force with the pivotable cover 50, which is metallic, to maintain a clamping force on the fiber. Fiber holders as shown in FIG. 7 are known in the art and are sold by Ericsson of Sweden. These fiber holders are available in different widths for different splicing applications and with different groove sizes for receiving different sized fibers. Moreover, fiber holders 28 preferably have right and left hand orientations for simultaneous opening when the exposed and stripped free ends are splice d.

The stripping portion 24 of the stripper unit 18 is mounted adjacent the support block 26 and itself includes a support block 56 mounted to the base 14, a sliding block 58 mounted to the support block 56 by a precision ball bearing linear slide mechanism 60, and a stripping tool 62 mounted to the sliding block 58. Support block 56 is mounted to base 14 by conventional hardware or any other suitable arrangement. The precision ball bearing slide mechanism 60 preferably includes a track 64 and rotatable bearing elements 66 and permits smooth movement of the stripping tool 62 in the direction of the longitudinal axis of the fiber with respect to the base 14 while minimizing undesirable movement in other directions. The sliding block 58 can be attached to the slide mechanism by any suitable attachment device.

The stripping tool 62 is positioned inside of the sliding block 58 and is mounted thereto by clamping plate 68 and screws 70 that restrain movement of the forward portion of the stripping tool 62 with respect to sliding block 58. The sliding block 58 also includes threaded holes 72 transverse to the direction of the longitudinal axis of the fiber into which set screws 74 are inserted to accurately laterally position the stripping tool 62 with respect to sliding block 58.

Figure 2:
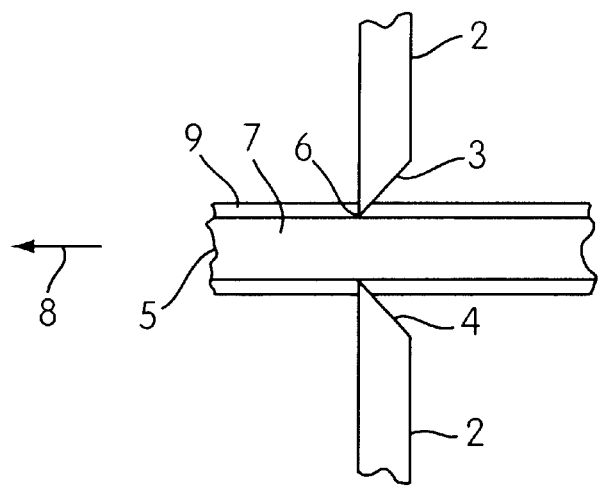
FIG. 2 is a cross section taken through lines 2—2 of FIG. 1.

The stripping tool 62 has many similarities to those described above and commercially available in the prior art manufactured by Micro Electronics, Inc and Klein Tools, and shown in U.S. Pat. Nos. 4,969,703 and 4,271,729 which are incorporated herein by reference. That is, it includes a pair of pivotally mounted handles 76 that move blade elements 78 with notches toward each other when the handles 76 are pivoted toward each other against a force applied by a biasing element 80. However, there are many significant differences. One significant difference is that the direction of the beveled notches are reversed such that they are opposite from that shown in FIG. 2. That is, when the coated fiber is pulled against the blade elements 78, it is pulled against the flat side of the blade and not the beveled side. As explained hereinafter, this tends to push the coating off of the fiber as opposed to scraping the coating off.

Additionally, a heating system is provide to soften the coating on the fiber to enable the coating to be pulled off by the blade without scraping. The heating system includes a heating element 82 coupled to a closed-loop controller 84 schematically shown in FIG. 9. The heating element 82 is preferably U-shaped and preferably made from a nickel-chromium alloy, a conductive ceramic or another suitable conductive material. The controller 84 is a well known PID controller which produces an output signal for providing a proportional amount of heat based on current temperature readings, the rate of change in the temperature and the average temperature from previous samples. The controller 84 is connected to a power source and has lines connected to the heating element 82 for providing current for heat and for determining the temperature readings. The temperature readings control the amount of current applied to the heating element 82 to consistently achieve a predetermined temperature for softening the coating of the fiber. In a preferred arrangement, the temperature is closely controlled at a desired temperature which can depend upon the type of coating used. Such a temperature is preferably about 350 degrees Fahrenheit, but other temperatures between 300–350 degrees have been found to work well without damaging the fiber. Temperatures between 220 and 365 degrees Fahrenheit have also been use depending on the specific fiber.

Figure 9:
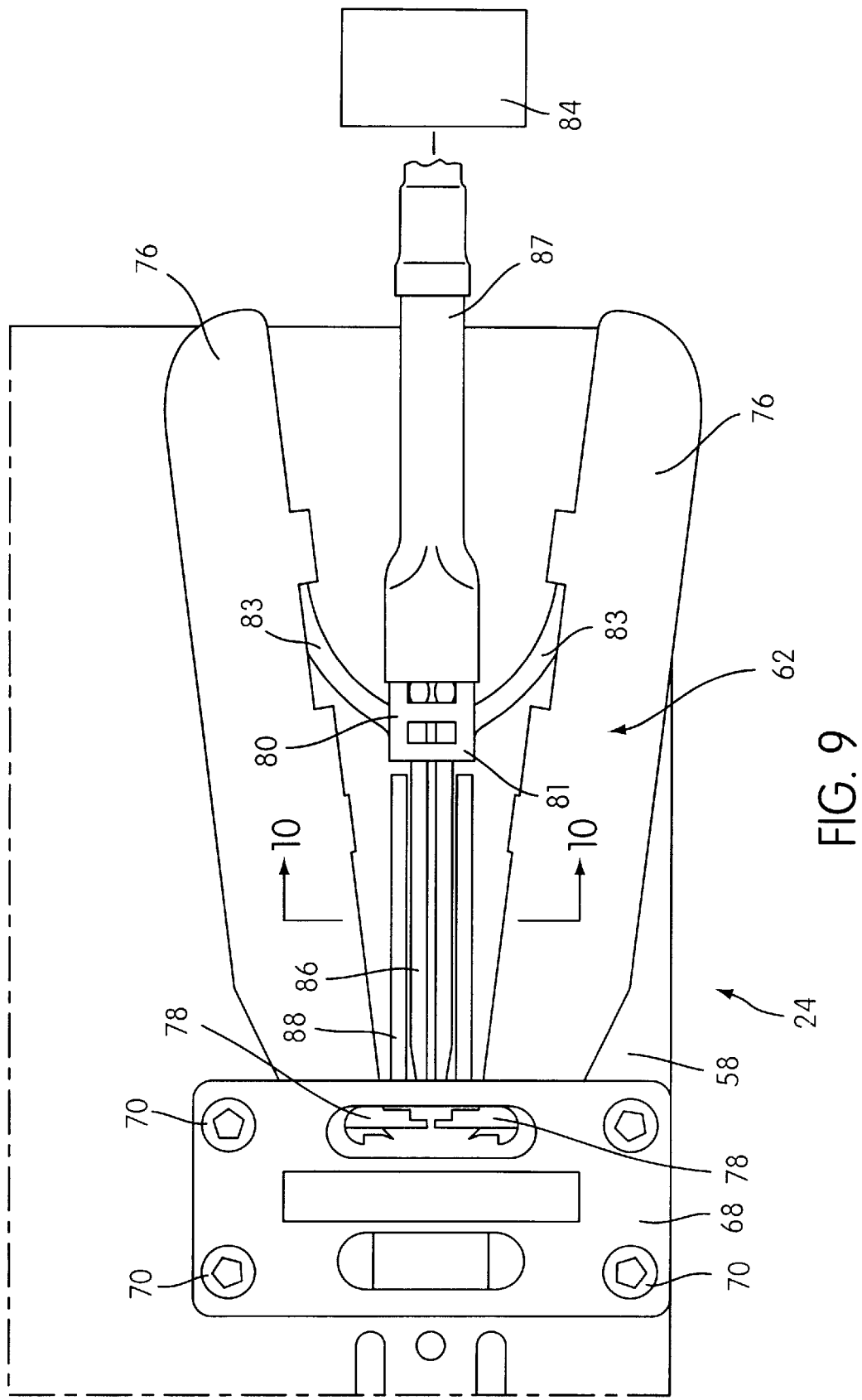
FIG. 9 is a top plan view of the stripping tool.
Figure 10:
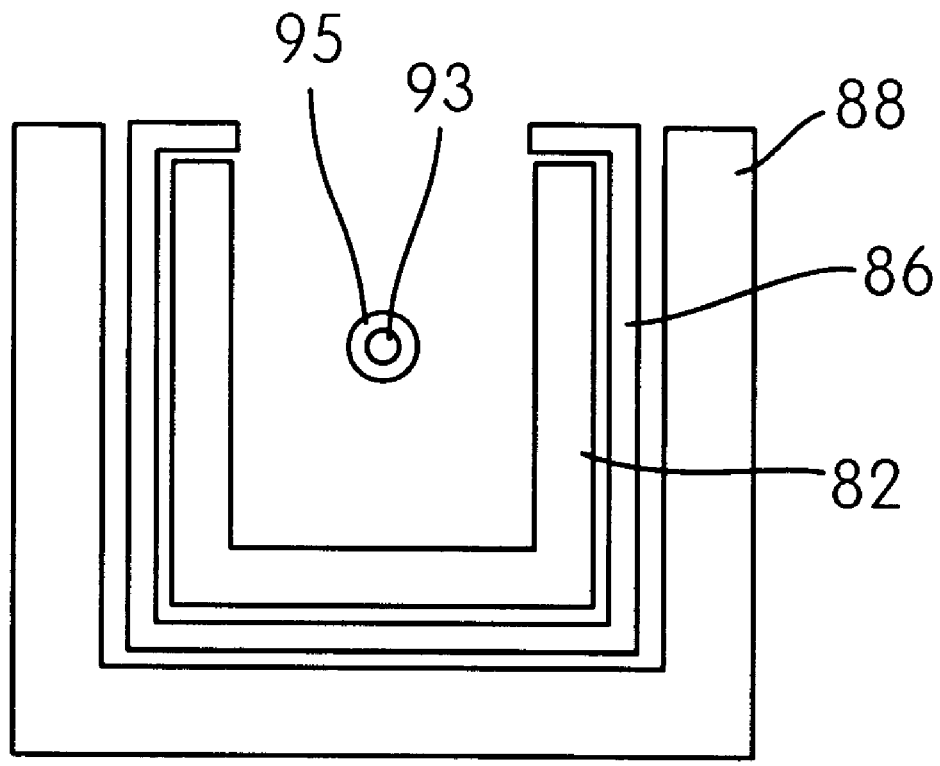
FIG. 10 is a cross section taken through line 10—10 of FIG. 9 shown with a coated fiber located therein.

As can be seen in FIGS. 9 and 10, the heating element 82 is positioned within a U-shaped heater casing 86 which is preferably made from aluminum or a heat resistant plastic material. Heater casing 86 is in turn located within a U-shaped heater guide channel 88 which may be made from plastic, metal, or any other suitable material. Heater guide channel 88 houses and keeps the heating element 82 and heater casing 86 in alignment. It is to be noted that numerous other structural arrangements for mounting a heating element to a stripping tool 62 may be used.

As shown in FIG. 10, the heating element 82 is sized to be larger than the outer diameter of a coated fiber. Thus, in operation, the heating element is heated and controlled at a desired temperature, e.g., 350° F. Due to radiation and convection from the heat of heating element 82, the coating 95 around fiber 93 in the channel softens and tends to loosen its bond with the fiber 93. It is noted that while the free end of the cable is unrestrained and unsupported, the rigidity of the fiber 93 and its short length that extends into the stripping tool 62 holds it relatively straight and between the surfaces of the heating element 82.

Stripper unit 18 also includes: (i) a vertical U-shaped groove 92 extending through the support block 56 and the front edge of a hole in the base 14 to permit easy removal of the waste coating after it has been stripped from the fiber 93, and (ii) curved recesses 90 on the sides of support block 56 to facilitate the squeezing of the handles 76 by human hands. Additionally, certain portions of the stripping tool 62 may be replaced by metal for enhanced strength if necessary. It should be noted that the heating element 82 and its casing 86 extend through a hollow section of the body 81 of the biasing element 80 and is preferably attached there within by an adhesive or other arrangement. This provides an efficient use of the limited space between the handles 76, prevents the cable 87 connecting the heating element 82 and the controller 87 from interfering with the movement of the handles 76, and does not impede the ability of outwardly projecting biasing arms 83 from biasing the handles 76 into an outward position.

Figure 5:
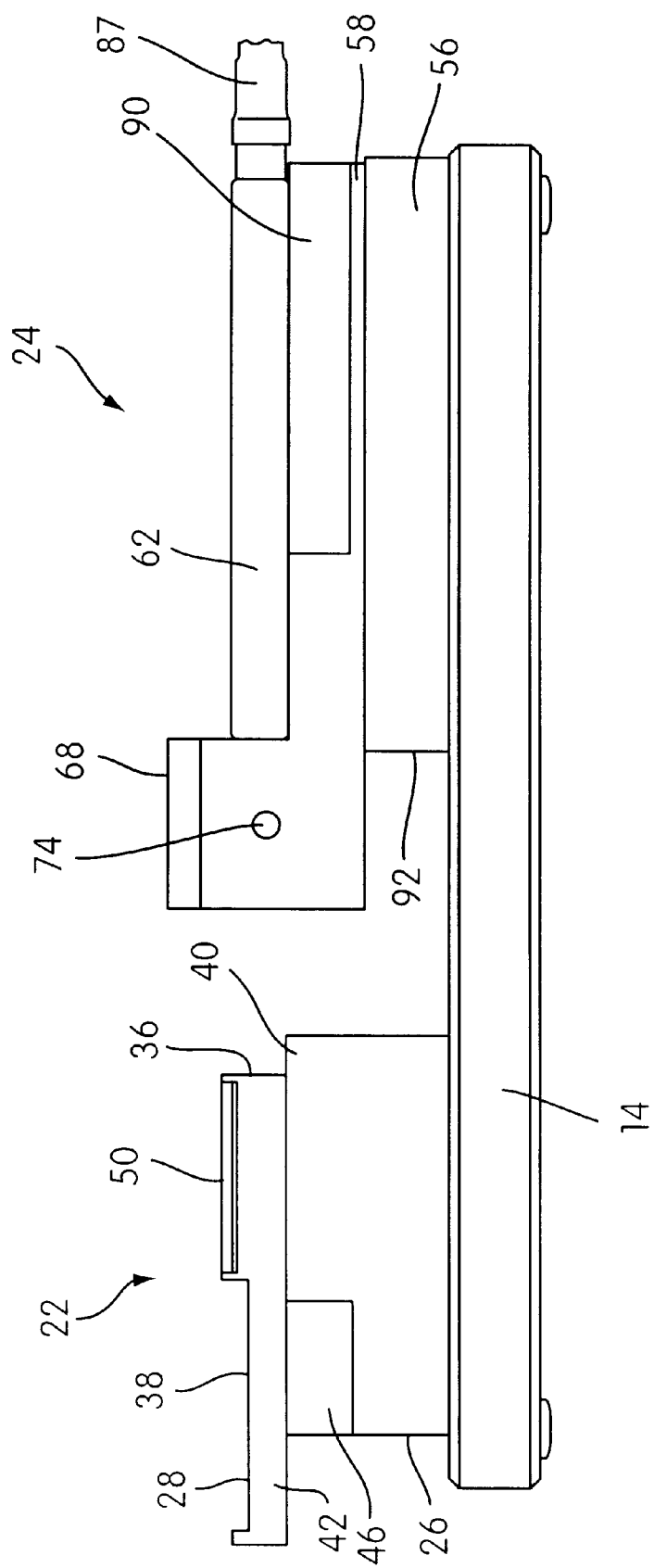
FIG. 5 is a side elevational view of FIG. 4 with the stripping device shown in a first position.
Figure 6:
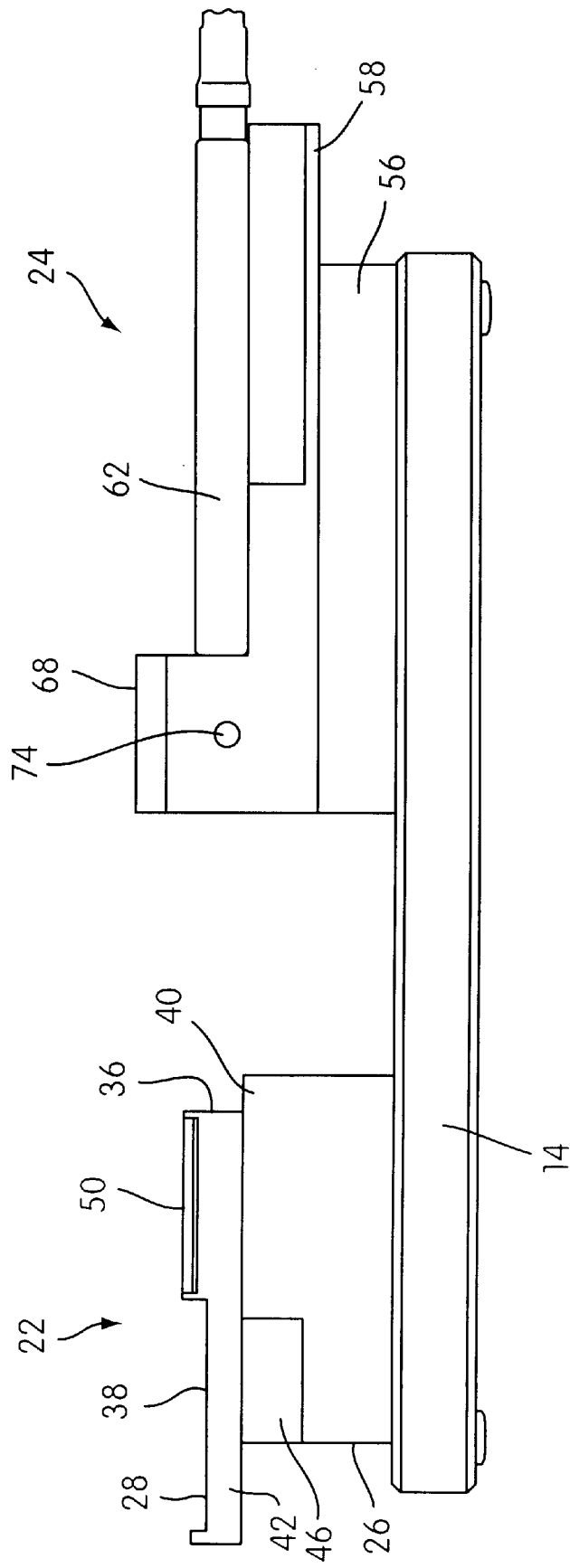
FIG. 6 is a side elevational view of FIG. 4 with the stripping device shown in a second position.

In operation, a coated fiber is inserted into a removable fiber holder 28 as previously described, and the removable fiber holder 28 is placed on the support block 26. While sliding block 58 with stripping tool 62 is in the position closest to fiber holding portion 22 as shown in FIG. 5, the free end of the coated fiber is placed into an aligning hole 97 in the end of stripping tool 62 that faces the fiber holding portion 22. The coating 95 on the end section of fiber 93 between the stripping blade 78 and the end of the fiber begins to soften when the heating element 82 is activated. The heating element never touches the fiber or its coating. The user then squeezes the handles 76 towards each other, and slides the sliding block 58 with stripping tool 62 to the position farther from fiber holding portion 22 as shown in FIG. 6. When the handles are squeezed, the edges for the stripping blades cut into the coating 95 and the coating is pulled off of the fiber 93 in one piece without scratching the fiber 93 when the stripping tool is moved away from the fiber holding 28. As the beveled side of the blades are reversed, the blades will not oscillate. The fiber 93 then has a free end that is stripped of its coating. Accordingly, the removable fiber holder 28 remains fixed during this stripping operation and the user is capable of stripping the free end of the fiber by using only one hand to squeeze the handles 76 and slide the block 58. This is advantageous as it permits a worker to be performing other functions with a free hand such as supporting the base during field use when a table or other flat support surface is not available. The single handed operation also permits amputees or workers with only one available hand to operate the unit. The removable fiber holder 28 with the stripped free end may be lifted from support block 26 and places on holder 17 of the cleaver unit to be cut. Between the time the end of the fiber is stripped and when it is spliced, nothing is intended to contact the stripped end which remains after the fiber cutting process. After the ends of two fibers are stripped and cut, they are brought to a splicing machine, not shown, to be fused.

While particular embodiments of the invention have been shown and described, it is recognized that various modifications thereof will occur to those skilled in the art. Therefore, the scope of the herein-described invention shall be limited solely by the claims appended hereto.

What is claimed is:

1. A device for stripping a coating from a coated fiber, said device comprising:
   a base;
   a coated fiber retaining member coupled to said base, said coated fiber retaining member having an elongated fiber holding groove defining a longitudinal axis and for retaining a portion of the coated fiber so that the fiber extends substantially along the longitudinal axis;
   a stripping tool slidably mounted to the base for movement along the longitudinal axis, the stripping tool having a plurality of stripping blades each coupled to a respective gripping handle, said stripping blades including a notch therein with a beveled side facing the coated fiber retaining member, said stripping blades extending entirely around the longitudinal axis such that it extends entirely around the coated fiber when the handles are placed in a stripping position; and
   a heating element disposed on the side of the stripping blades opposite from said coated fiber retaining member, said heating element being spaced from the longitudinal axis and so that it is spaced from a coated fiber inserted into the stripping tool to be stripped of its coating.

2. The device of claim 1, further comprising a controller for adjusting the temperature of the heating element.

3. The device of claim 2, wherein said controller includes a temperature sensing device and closed loop temperature controls.

4. The device of claim 3 wherein said controller is a PID controller.

5. The device of claim 1, wherein said heating element is generally U-shaped.

6. The device of claim 1, wherein said stripping tool includes a gripping handle biasing device to bias the gripping handles away from a stripping positions, said heating element extending through said biasing device.

7. The device of claim 1, wherein said stripping tool includes a gripping handle biasing device, said gripping handle biasing device biasing the gripping handles away from the stripping position, said heating element extending through said biasing device.

8. The device of claim 1, wherein the heating element is linearly slidable along said longitudinal axis.

9. An apparatus for stripping a protective coating from a fiber, said apparatus comprising:
   a base;
   a coated fiber retaining member coupled to said base, said coated fiber retaining member having an elongated fiber holding groove defining a longitudinal axis and adapted for retaining a portion of the coated fiber so that the fiber extends substantially along the longitudinal axis;
   a stripping tool slidably mounted to the base along said longitudinal axis between a first position wherein the stripping tool is spaced from the coated fiber retaining member by a first distance and a second position wherein the stripping tools is spaced from the coated fiber retaining member by a distance greater than the first distance, the stripping tool having a plurality of stripping blades each coupled to a respective gripping handle, wherein the stripping blades is movable towards and away from each other by pivoting the gripping handles and the stripping blades can be moved towards and away from the coated fiber retaining member by translating the gripping handles along the longitudinal axis.

10. The apparatus of claim 9, wherein said stripping blades include a notch therein with a beveled side facing the coated fiber retaining member, said stripping blades extending entirely around the longitudinal axis when the handles are placed in a stripping position.

11. The apparatus of claim 9, further comprising a heating element disposed adjacent the stripping tool, said heating element for softening the coating around the portion of the fiber to be stripped.

12. The apparatus of claim 9, further comprising adjustment means for adjustably means for a adjustably setting the relative positioning between the coated fiber retaining member and the base.

13. The device of claim 12, wherein said adjustment means includes separate coarse and fine adjustment means for adjustably positioning said coated fiber retaining member with respect to the base in a coarse and fine manner, respectively.

* * * * *